United States Patent [19]

Rooney

[11] E Re. 31,395

[45] Reissued Sep. 27, 1983

[54] ALUMINUM POLISHING COMPOSITIONS

[75] Inventor: Terence R. Rooney, Bromsgrove, England

[73] Assignee: Albright & Wilson Ltd., Warley, England

[21] Appl. No.: 312,482

[22] Filed: Oct. 19, 1981

Related U.S. Patent Documents

Reissue of:

[64] Patent No.: 4,116,699
Issued: Oct. 26, 1978
Appl. No.: 733,508
Filed: Oct. 18, 1976

U.S. Applications:

[63] Continuation of Ser. No. 134,758, Mar. 28, 1980, abandoned.

[30] Foreign Application Priority Data

Oct. 20, 1975 [GB] United Kingdom ..... 42902/75

[51] Int. Cl.[3] ..... C09K 13/06

[52] U.S. Cl. ..... 106/3; 148/6.17; 156/635; 156/665; 156/903; 252/79.4

[58] Field of Search ..... 106/3, 14.12, 14.16, 106/14.21; 252/79.4, 390, 392; 156/665, 903; 148/6.17

[56] References Cited

U.S. PATENT DOCUMENTS

| | | | |
|---|---|---|---|
| 2,694,001 | 11/1954 | Hayes et al. | 252/79.4 |
| 3,425,881 | 2/1969 | Cohn | 156/665 |
| 3,876,371 | 4/1975 | Costain et al. | 252/390 |

OTHER PUBLICATIONS

Cotton et al., "Benzotriazole and Related Compounds as Corrosion Inhibitors for Copper," Brit. Corr. Jour., vol. 2, 1967, pp. 1-5.

*Primary Examiner*—Lorenzo B. Hayes
*Attorney, Agent, or Firm*—Frishauf, Holtz, Goodman & Woodward

[57] ABSTRACT

Aluminium polishing solutions containing phosphoric, nitric and sulphuric acids provide etched finishes if the proportion of sulphuric acid is increased. The invention inhibits such etching by addition to the bath of an aromatic ring compound, in which at least 2 hetero atoms are conjugated with the ring such as benztriazole.

13 Claims, No Drawings

ALUMINUM POLISHING COMPOSITIONS

Matter enclosed in heavy brackets [ ] appears in the original patent but forms no part of this reissue specification; matter printed in italics indicates the additions made by reissue.

*This is a continuation of application Ser. No. 134,758 filed Mar. 28, 1980, now abandoned, which, in turn, is an application for Reissue of U.S. Pat. No. 4,116,699, issued Sept. 26, 1978.*

The present invention relates to aluminium polishing compositions of the type which comprise a mixture of phosphoric and nitric acid and in particular those which additionally contain sulphuric acid.

The use of compositions of the above type is well known. Typically the essential ingredients are phosphoric and nitric acids, but because of the high cost of phosphoric acid it has been often found commercially advantageous to substitute cheaper sulphuric acid for a part of the phosphoric acid.

Typical polishing compositions of this type comprise about 70–76% by weight of phosphoric acid (specific gravity = 1.75) about 15–20% concentrated sulphuric acid, about 5% concentrated nitric acid (specific gravity 1.50). Polishing baths also contain a small amount e.g. about 0.1% of heavy metal, which has been found necessary to provide a bright, attractive finish. Generally the heavy metal may be copper, nickel or iron, however in baths containing a substantial amount of sulphuric acid, the use of copper has been found essential. The compositions may also conveniently contain a small amount of boric acid and a wetting agent. Ammonium and substituted ammonium ions have also been included in aluminium polishing solutions to inhibit fuming.

It would be economically advantageous to increase the proportion of sulphuric acid, but a particular problem, common to phosphoric/sulphuric/nitric acid polishing compositions has prevented the commercial introduction of any composition containing more than about 24% by weight of sulphuric acid i.e. one part by weight of commercial concentrated (s.g. 1.84) sulphuric acid to three parts concentrated (s.g. 1.75) phosphoric acid. This problem is called "transfer etch".

Transfer etch occurs when the polished work is removed from the polishing bath and drained preparatory to being transferred to the next treatment stage (usually a rinsing stage). If the work is allowed to drain for too long, an unsightly, white, etched effect mars the surface of the work. In baths containing a high proportion of phosphoric acid the onset of transfer etch is generally sufficiently slow for it to be practical to transfer work before significant etching can occur. However, if the proportion of sulphuric acid is increased, the onset of transfer etch becomes more rapid, shortening the permissible time available for transferring the work until eventually it is impossible in practice to polish the work without a quite unacceptable degree of etching. Generally transfer etch becomes a serious problem when the proportion of sulphuric acid to phosphoric acid in the bath exceeds about 1:3 (measured as parts by weight of the commercial, concentrated acids).

We have now discovered that certain aromatic organic compounds have a beneficial effect in reducing the occurrence of transfer etch in aluminium polishing solutions. The presence of such etch inhibitors therefore permits the proportion of sulphuric acid in an aluminium polishing solution to be substantially increased.

Our invention therefore provides an aluminium polishing solution comprising phosphoric acid, nitric acid, sulphuric acid and dissolved copper, which additionally comprises as an etch inhibitor, an organic compound comprising an aromatic ring having at least two hetero atoms conjugated therewith.

The etch inhibitor may be any aromatic ring compound (including heteroaromatic rings) which has at least two hetero atoms in or conjugated with the aromatic ring. The aromatic ring is preferably a benzene ring but may alternatively be a naphthalene ring or a pyridine, pyrazine or other heteroaromatic ring. The heteroatoms are preferably nitrogen, oxygen or sulphur atoms having electron pairs conjugated with the aromatic ring.

Because of the aggressive nature of the polishing solution with its strongly acidic and nitrating character, the etch inhibitor effectively present in the solution must be sufficiently stable to withstand such a hostile medium. This we have found is sufficiently achieved by the presence of an aromatic ring system with its resonance stabilised structure. The resonance must extend to cover at least two hetero atoms which are capable of forming complexes and which are conjugated (or conjugable) in or with the ring. However, in view of the chemically active nature of solution, the etch inhibitor effectively present in the composition will in many instances differ appreciably from the compound originally added. Any compound which is converted by the medium to provide an etch inhibitor as hereinbefore defined may be used as a precursor. For example compounds which possess the essential ring nucleus together with oxidisable, or similarly vulnerable substituent groups may be used, if in practice the unstable substituents are destroyed to leave the effective nucleus with its conjugated hetero atoms. The hetero atoms may form part of any group which does not preclude them from conjugating with, or as part of, the aromatic ring. The nitration of the aromatic nucleus by the medium has not been found to have an adverse effect on the performance of the etch inhibitor. For example, when benztriazole, one of our preferred etch inhibitors, is added to the composition, the initial reddish colour is gradually replaced by a green colouration associated with the nitration of the benztriazole, but the performance of the etch inhibitor is not impaired.

The hetero atom may be part of an amino or imino group, hydroxyl group, the keto group of a quinone, or a heterocyclic ring, such as triazole, thiazole or thiadiazole ring.

Preferably the etch inhibitor has a benzene or benzo ring fused to a heterocyclic ring, e.g. a five membered heterocyclic ring, for example, benztriazole.

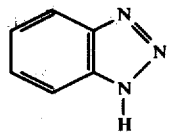

is particularly effective. Substituted benztriazoles in which the benzene nucleus is substituted with for example, hydroxy, alkoxy, amino, nitro, or alkyl groups are also operative as are halo-substituted benztriazoles.

Other triazole compounds which may be used include naphthalene triazole and naphthalene bistriazole.

Benzofuroxan

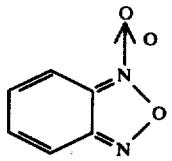

and substituted benzofuroxans such as nitro, hydroxy alkoxy, amino, alkyl or halo benzofuroxans are also highly effective. Other compounds which are particularly effective include benzthiadiazole

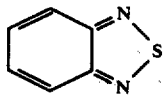

substituted benzthiadiazoles, benzthiazole and substituted benzthiazoles including benzthiazoles of the formula

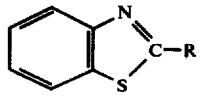

where R is hydrogen or an alkyl, hydroxy, alkoxy, amino, mercapto, alkyl sulphide or other group, e.g. 2-mercapto benzthiazole. Benzimidazole and substituted benzimdazoles of the formula

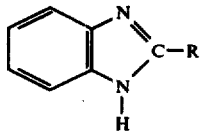

where R has the same significance as previously, are effective as are benzimidazoles having substituents on the benzene ring. Benzoxazole, substituted benzoxazoles of the formula

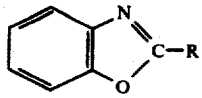

where R has the same significance as before the nuclear substituted benzoxazoles are similarly effective as etch inhibitors.

Di and poly substituted benzenes in which at least two substituent groups are selected from amino, nitro, hydroxy and alkoxy groups are effective, such as o. phenylene diamine, o. amino phenol, m. phenylene diamine, catechol, dinitrobenzene. Similarly di- and polysubstituted naphthalenes, such as tetra amino naphthalenes are effective. Diaminonaphthalenes would doubtless be effective but have been avoided because of the risks of carcinogenic action o. and p. benzoquinone and their mono and di imines are effective, and so are heteroaromatic compounds containing one or more hetero atom in an aromatic ring system, such as, for example, hetero-substituted pyridines, pyrazine, substituted pyrazines and melamine.

From the foregoing it will be apparent that a very great variety of compounds will be effective as etch inhibitors according to our invention. In many instances the foregoing compounds will undergo chemical changes in the solution e.g. nitration, oxidation or coupling to form azo compounds, so that the effective etch inhibitor present in the solution may differ from the compound added to the composition. For this reason it is often possible to inhibit transfer etch by adding to the composition a compound which is not itself an etch inhibitor as defined above, but which is a precursor, converted to an etch inhibitor in situ by the acidic medium.

Effective etch inhibitors are readily identified by the presence of an aromatic ring system (usually, but not essentially, a six carbon ring) which is stable in the highly acidic medium, and at least two hetero atoms conjugated or conjugable with the ring. An aromatic system is essential for stability in the aggressive polishing solution. Compounds lacking an aromatic ring system, such as thiazole, thiadiazole, dimercaptothiadiazole or triazole are ineffective, probably due to instability in the medium. At least two hetero atoms, preferably nitrogen, oxygen or sulphur, especially nitrogen, stabilised by conjugation with ring, are necessary, probably to provide chelating power.

The etch inhibitor is preferably present in a proportion of from 0.05% by weight up to 0.7% or higher. Proportions above 0.5%, although not harmful, are usually unnecessary and therefore undesirable on commercial grounds. Proportions less than 0.05% usually give insufficient inhibition of transfer etch. Generally it is desirable to use higher proportions of the etch inhibitor in baths which have been used for some time, than are necessary in freshly prepared baths. For example, baths containing less than about 30 gm per liter dissolved aluminium work satisfactorily with from 2 to 4 gm per liter of etch inhibitor, while baths containing more than 30 gm per liter aluminium may conveniently contain from 4 to 6 gm per liter of the etch inhibitor.

The proportion of nitric acid in the baths of our invention may typically be the same as in conventional aluminium polishing baths, e.g. 3 to 10% by volume as concentrated (s.g. = 1.42) nitric acid, or from 1.2 to 4.2% by weight of 100% nitric acid. It is preferred to adjust the proportion of nitric acid in accordance with the aluminium content of the solution. Typically a freshly prepared bath is in the upper part and fully aged bath (at equilibrium) is in the lower part, of a preferred range of from 4 to 8% v/v concentrated acid. Preferably the proportion of 100% nitric acid is 1.6 to 3.5% by weight and most preferably between 2.4 and 3.1%. The proportion of phosphoric to sulphuric acid in the baths of our invention may be as low as 1:2 by weight, measured as the commercial concentrated acids i.e. [40% $P_2O_5$] phosphoric acid (s.g. = 1.75) and 98% sulphuric acid (s.g. 1.84). Lower proportions are preferably avoided due to the risk of reducing the sulphuric acid, giving rise to fumes of $SO_2$ and $H_2S$, the deposition of sulphur on the work, and the precipitation of copper sulphide.

The maximum is not critical and may for example be up to 3:1 or even higher. However such high proportions are undesirable on econimic grounds. Moreover, transfer etch is not such a serious problem at high phosphoric acid levels. We therefore prefer to employ proportions of phosphoric to sulphuric less than 3:1, e.g. 1.5 to 1:1.5, preferably 1.2:1 to 1:1.2, typically 1:1. Sulphuric and phosphoric acid together usually constitute at least 90%, preferably at least 93% e.g. at least 95% of the weight of the composition.

The proportion of water is not critical and is usually below 5% by weight. If the composition is formulated in the usual way, using the ordinary technical, concentrated phosphoric, nitric and sulphuric acids, which contain small amounts of water, it is not normally necessary to add any further water. However if the proportion of phosphoric acid is high and/or the aluminium content rises to a high level, it may be necessary to add water to prevent the precipitation of aluminium phosphate. If the proportion of water is too high, there is a decline in specularity. Accordingly it is preferred to add the minimum amount of water required to prevent precipitation of aluminium phosphate, whilst maintaining good specularity.

The baths of our invention contain copper as an essential ingredient, e.g. in a proportion of up to 0.2% by weight, preferably 0.01% to 0.16%, most preferably 0.1 to 0.15%. The copper may conveniently be introduced by adding a copper salt, preferably of one of the acid anions of the system, for example from 1 to 10 g per liter, preferably 4 to 5 g per liter of hydrated copper sulphate.

Polishing baths of the present invention may optionally contain ammonium or substituted ammonium ions, in order to reduce fuming. For example, the bath may contain between 0.05 and 0.75 molar of ammonium or substituted ammonium ions preferably 0.2 to 0.4 molar. The concentration may conveniently be increased to excess of 0.75 molar, or 100 gpl expressed as $(NH_4)_2SO_4$, in replenishing solutions in order to maintain the concentration of ammonium or substituted ammonium ion in the bath at its optimum working level. The ammonium or substituted ammonium ion is preferably added as the ammonium salt if one of the acid components of the bath, e.g. ammonium sulphate or diammonium phosphate. Compositions of our invention may also optionally contain some boric acid.

In addition to the foregoing components, polishing baths conventionally contain wetting agents, and these are also preferably presebt in our novel bath. Any of the wetting agents used hitherto in polishing baths may be employed for example, non-ionic surfactants, such as alkyl polyethers. The wetting agent is normally present in trace quantities of for example up to 0.01% although higher proportions may be used.

After a period of use the bath also accumulates dissolved aluminium, which typically rises to an equilibrium valve, when fresh dissolution of aluminium in the bath is balanced by dragout losses. The equilibrium value depends to some extent upon the conditions of the operation of the bath but under normal conditions is about 30 gms—50 gms aluminium per liter of solution.

The normal operating temperature of our novel baths is about 90° C. to 115° C.

Our novel baths may be used to polish aluminium and a wide variety of aluminium containing alloys.

The work is typically immersed for from 0.5 to 5 minutes, depending on the alloy, most usually about 3 minutes.

It is also possible to use our novel solutions for electropolishing. The work, usually after a preliminary period of immersion in the bath, is made anodic with respect to the tank containing the bath or a separate electrode immersed in the bath.

The bath may be maintained by periodic topping up with fresh solution to replace drag out losses. Occasional additions of nitric acid or water to make good losses due to evaporation may be required.

The invention will be illustrated by the following examples:

EXAMPLE 1

A chemical polishing solution was prepared containing 45% w/w $H_3PO_4$(1.75 s.g.), 50% w/w $H_2SO_4$(1.84 s.g.), 1.5% w/w diammonium phosphate, 0.25% w/w copper sulphate, 2% nitric acid (1.50 s.g), the rest being water. The bath was aged to 30 gpl Al by dissolving aluminium and the nitric acid content readjusted to 2% w/w. Components of HE9 alloy and BA 211 bright trim alloy were polished in this bath for 3 minutes at 100° C. and subjected to various drainage times before rinsing in hot water. It was found that at drainage times greater than ten seconds a grey 'transfer etch' appeared on the upper surface of components and could not be removed in 50% nitric acid desmutting solution.

To the above polishing solution 3 g per liter benztriazole was added and the tests carried out again. Transfer etch appeared only after a drainage time of 25 to 30 seconds, in contrast to the above solution without benztriazole. The solution was used for polishing until the aluminium content rose to 35 gpl and a further 2 gpl benztriazole was added. This solution continued to give good results and no loss of benztriazole could be detected. The solution was maintained in the usual way by adding fresh polishing solution and nitric acid as required. The replenishing solution contained 5 gpl benztriazole.

EXAMPLE 2

Composition of polishing solution employed:

| Constituent | w/w % |
|---|---|
| $H_3PO_4$ s.g. 1.75 | 56.0 |
| $H_2SO_4$ s.g. 1.84 | 38.5 |
| $HNO_3$ s.g. 1.50 | 3.4 |
| $CuSO_4SH_2O$ | 0.25 |
| $H_2O$ | 1.85 |
| s.g. after ageing—1.80 | |

Samples of this composition were aged, i.e. their aluminium contents were raised to 30 g/l Al, a typical concentration found in working aluminium chemical polishing solutions.

A sample of the aged polishing solution was heated to 105° C. and adjusted to the optimum nitric acid content of 3% W/W SG 1.50 acid. Test pieces of an aluminium alloy suitable for chemical polishing (BA 211) were treated for 2 minutes by immersion in the solution whilst gently agitated. These test pieces were drained in air for (i) <1 second and (ii) 30 seconds before rinsing. The short draining time was too short for the transfer etch to manifest itself and was taken as a standard that the particular solution sample was performing satisfactorily. A transfer time of 30 seconds is the longest used in commercial practice and in solutions of the above composition produced a complete coating of light grey transfer etch over the whole surface of the test piece.

The compound to be tested was added to the sample in increments of 1 gpl and between such addition, after complete dissolution, test pieces were treated as above and drained in air for 30 seconds before rinsing in water. The efficiency of the compound at each concentration was estimated by visual estimation of the proportion of the area of the test piece covered with transfer etch to the nearest 10%. Additions were carried on until:

(i) 100% removal of transfer etch was obtained;

(ii) The transfer etch reached a minimum which was not reduced by subsequent additions;

(iii) No effect was observed in reducing transfer etch and additions totalled 10 gpl.

1, 2, 3 Benztriazole itself has been tested up to 50 gpl without any further effect upon performance being observed after complete suppression of transfer etch at 5 gpl.

The compounds are listed in decreasing order of image clarity (specular brightness) of the finish and increasing order of transfer etch.

| Compound | Formula | Concentration | % Reduction In Transfer Etch |
|---|---|---|---|
| 1,2,3, benztriazole | 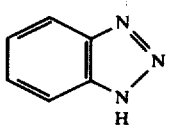 | 5 gpl | 100% |
| benzofuroxan | 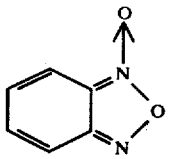 | 2 gpl | 100% |
| 2-1-3-benzo-thiadiazole | 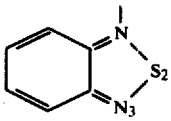 | 2 gpl | 100% |
| o-phenylene-diamine | 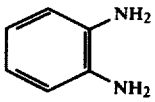 | 1 gpl | 90% |
| m-phenylene-diamine | 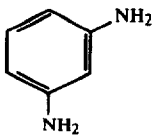 | 1 gpl | 90% |
| catechol | 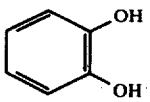 | 1 gpl | 90% |
| o-amino-phenol | 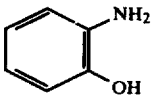 | 1 gpl | 90% |
| 2-mercapto-benzthiazole | 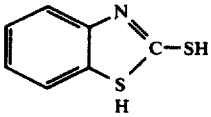 | 1 gpl | 90% |

-continued

| Compound | Formula | Concentration | % Reduction In Transfer Etch |
|---|---|---|---|
| 2-mercapto-benz-imidazole | 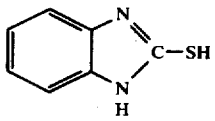 | 1 gpl | 80% |
| 2-mercapto-benzoxazole | 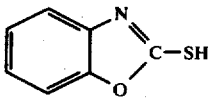 | 1 gpl | 70% |
| melamine | 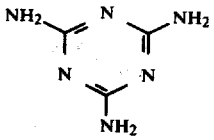 | 4 gpl | 60% |
| Comparative Example | | | |
| 1,2,4-triazole | 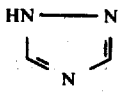 | 10 gpl | 0% |
| 2,5-dimercap-to-1,3,4-thia-diazole | 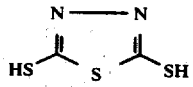 | 10 gpl | 0% |
| pentamethyl-ene tetrazole | 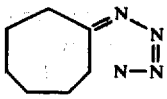 | 10 gpl | 0% |

We claim:

1. An aluminum polishing solution consisting essentially of (a) phosphoric and sulphuric acid in a relative proportion of from 1.5 to 1:1.5, measured as [40 percent $P_2O_5$] phosphoric acid *having a specific gravity of 1.75* and 98 percent sulphuric acid and together constituting at least 90 percent of the total composition;

(b) nitric acid in a proportion by weight of from 1.2 to 4.2 percent as 100 percent nitric acid;

(c) dissolved copper in a concentration of from 0.01 to 0.2 percent by weight;

(d) dissolved aluminum in a concentration of between zero and saturation;

(e) from 0.05 percent to 0.7 percent by weight of an organic etch inhibitor which is a bath soluble organic compound having an aromatic ring selected from the group consisting of benzene, naphthalene, benzoquinone, pyridine, pyrazine, and melamine rings and at least 2 hetero atoms selected from the group constituting nitrogen oxygen and sulphur atoms conjugated with said aromatic ring; and (f) the balance substantially of water.

2. An aluminium polishing solution as claimed in claim 1 wherein the etch inhibitor is an aromatic organic compound having an aromatic 6-carbon ring and at least 2 hetero atoms selected from nitrogen, oxygen and sulphur conjugated with said ring.

3. An aluminium polishing solution as claimed in claim 2 wherein the hetero atoms are present in any member of the group selected from amino-, imino-, hydroxy-, alkoxy- and quinone groups and a heterocyclic ring.

4. An aluminium polishing solution as claimed in claim 1 wherein the etch inhibitor is selected from unsubstituted and nitro-, hydroxy-, alkoxy-, amino-, mercapto-, alkyl- and halo, substituted members of the group consisting of benzofuroxan, benzthiadiazole, benzthiazole, benzoxazole, and benzimidazole.

5. An aluminium polishing solution as claimed in claim 1 wherein the etch inhibitor is a substituted benzene having at least 2 substituent groups selected from the group consisting of amino-, nitro-, hydroxy-, and alkoxy groups.

6. An aluminium polishing solution as claimed in claim 1 wherein the etch inhibitor is a benzoquinone, or imine thereof.

7. An aluminium polishing solution as claimed in claim 1 containing from 0.05 to 0.75 molar ammonia.

8. An aluminum polishing solution as claimed in claim 1 wherein said proportion of phosphoric acid to sulphuric acid is from 1.2:1 to 1:1.2.

9. An aluminum polishing solution consisting essentially of (a) phosphoric and sulphuric acid in a relative proportion of from 1:2 to 3:1, measured as [40 percent $P_2O_5$] phosphoric acid *having a specific gravity of 1.75* and 98 percent sulphuric acid and together constituting at least 90 percent of the total composition;

(b) nitric acid in a proportion by weight of from 1.2 to 4.2 percent as 100 percent nitric acid;

(c) dissolved copper in a concentration of from 0.01 to 0.2 percent by weight;

(d) dissolved aluminum in a concentration of between zero and saturation;

(e) from 0.05 percent to 0.7 percent by weight of an organic etch inhibitor which is a bath soluble organic compound having an aromatic ring selected from the group consisting of hydroxy-, amino-, alkoxy-, nitro-, alkyl-, and halo- substituted benztriazoles; and (f) the balance substantially of water.

[10. An aluminium polishing solution as claimed in claim 9 wherein the etch inhibitor is benztriazole.]

11. An aluminum polishing solution as claimed in claim 9 wherein the proportion of phosphoric acid to sulphuric acid is from 1.5:1 to 1:1.5, and wherein said solution contains from 0.05 to 0.75 molar ammonia.

*12. An aluminum polishing solution as claimed in claim 9 wherein said solution contains from 0.05 to 0.75 molar ammonia.*

*13. An aluminum polishing solution consisting essentially of*

*(a) phosphoric and sulphuric acid in a relative proportion of from 1:2 to 3:1, measured as phosphoric acid having a specific gravity of 1.75 and 98 percent sulphuric acid and together constituting at least 90 percent of the total composition;*

*(b) nitric acid in a proportion by weight of from 1.2 to 4.2 percent as 100 percent nitric acid;*

*(c) dissolved copper in a concentration of from 0.01 to 0.2 percent by weight;*

*(d) dissolved aluminum in a concentration of between zero and saturation;*

*(e) from 0.05 percent to 0.7 percent by weight of benztriazole;*

*(f) the balance substantially water.*

*14. An aluminum polishing solution as claimed in claim 13 wherein said solution contains from 0.05 to 0.75 molar ammonia.*

* * * * *